United States Patent
Li

(10) Patent No.: US 10,891,065 B2
(45) Date of Patent: Jan. 12, 2021

(54) METHOD AND SYSTEM FOR ONLINE CONVERSION OF BAD BLOCKS FOR IMPROVEMENT OF PERFORMANCE AND LONGEVITY IN A SOLID STATE DRIVE

(71) Applicant: Alibaba Group Holding Limited, Grand Cayman (KY)

(72) Inventor: Shu Li, Bothell, WA (US)

(73) Assignee: Alibaba Group Holding Limited, George Town (KY)

( * ) Notice: Subject to any disclaimer, the term of this patent is extended or adjusted under 35 U.S.C. 154(b) by 0 days.

(21) Appl. No.: 16/371,537

(22) Filed: Apr. 1, 2019

(65) Prior Publication Data

US 2020/0310645 A1 Oct. 1, 2020

(51) Int. Cl.
G06F 3/06 (2006.01)
G06F 12/1009 (2016.01)
G06F 12/02 (2006.01)

(52) U.S. Cl.
CPC .............. *G06F 3/064* (2013.01); *G06F 3/061* (2013.01); *G06F 3/0616* (2013.01); *G06F 3/0679* (2013.01); *G06F 12/0246* (2013.01); *G06F 12/1009* (2013.01)

(58) Field of Classification Search
CPC ........ G06F 3/064; G06F 3/061; G06F 3/0616; G06F 3/0617; G06F 3/0619; G06F 3/0679; G06F 3/0653; G06F 12/0246
See application file for complete search history.

(56) References Cited

U.S. PATENT DOCUMENTS

| | | |
|---|---|---|
| 3,893,071 A | 7/1975 | Bossen |
| 4,718,067 A | 1/1988 | Peters |
| 5,394,382 A | 2/1995 | Hu |
| 5,732,093 A | 3/1998 | Huang |
| 5,802,551 A | 9/1998 | Komatsu |
| 5,930,167 A | 7/1999 | Lee |
| 6,098,185 A | 8/2000 | Wilson |
| 6,148,377 A | 11/2000 | Carter |
| 6,457,104 B1 | 9/2002 | Tremaine |
| 6,658,478 B1 | 12/2003 | Singhal |
| 7,351,072 B2 | 4/2008 | Muff |
| 7,599,139 B1 | 10/2009 | Bombet |

(Continued)

FOREIGN PATENT DOCUMENTS

WO 9418634 8/1994

OTHER PUBLICATIONS

Jimenez, X., Novo, D. and P. Ienne, "Phoenix: Reviving MLC Blocks as SLC to Extend NAND Flash Devices Lifetime," Design, Automation & Text in Europe Conference & Exhibition (Date), 2013.*

(Continued)

*Primary Examiner* — Tracy A Warren
(74) *Attorney, Agent, or Firm* — Shun Yao; Park, Vaughan, Fleming & Dowler LLP

(57) ABSTRACT

One embodiment facilitates data placement. During operation, the system monitors a condition of a plurality of blocks of a non-volatile memory. The system determines that a condition of a first block falls below a first predetermined threshold, wherein the first block has a first capacity. The system formats the first block to obtain a second block which has a second capacity, wherein the second capacity is less than the first capacity.

20 Claims, 8 Drawing Sheets

(56) References Cited

U.S. PATENT DOCUMENTS

| | | |
|---|---|---|
| 7,953,899 B1 | 5/2011 | Hooper |
| 7,958,433 B1 | 6/2011 | Yoon |
| 8,085,569 B2 | 12/2011 | Kim |
| 8,144,512 B2 | 3/2012 | Huang |
| 8,166,233 B2 | 4/2012 | Schibilla |
| 8,281,061 B2 | 10/2012 | Radke |
| 8,751,763 B1 | 6/2014 | Ramarao |
| 8,825,937 B2 | 9/2014 | Atkisson |
| 8,868,825 B1 | 10/2014 | Hayes |
| 8,904,061 B1 | 12/2014 | O'Brien, III |
| 9,015,561 B1 | 4/2015 | Hu |
| 9,043,545 B2 | 5/2015 | Kimmel |
| 9,088,300 B1 | 7/2015 | Chen |
| 9,129,628 B1 | 9/2015 | Fallone |
| 9,280,472 B1 | 3/2016 | Dang |
| 9,280,487 B2 | 3/2016 | Candelaria |
| 9,336,340 B1 | 5/2016 | Dong |
| 9,436,595 B1 | 9/2016 | Benitez |
| 9,529,601 B1 | 12/2016 | Dharmadhikari |
| 9,588,698 B1 | 3/2017 | Karamcheti |
| 9,588,977 B1 | 3/2017 | Wang |
| 9,747,202 B1 | 8/2017 | Shaharabany |
| 9,852,076 B1 | 12/2017 | Garg |
| 9,875,053 B2 | 1/2018 | Frid |
| 10,013,169 B2 | 7/2018 | Fisher |
| 10,199,066 B1 | 2/2019 | Feldman |
| 10,229,735 B1 | 3/2019 | Natarajan |
| 10,235,198 B2 | 3/2019 | Qiu |
| 10,318,467 B2 | 6/2019 | Barzik |
| 10,437,670 B1 | 10/2019 | Koltsidas |
| 10,649,657 B2 | 5/2020 | Zaidman |
| 2001/0032324 A1 | 10/2001 | Slaughter |
| 2002/0073358 A1 | 6/2002 | Atkinson |
| 2002/0095403 A1 | 7/2002 | Chandrasekaran |
| 2003/0145274 A1 | 7/2003 | Hwang |
| 2003/0163594 A1 | 8/2003 | Aasheim |
| 2003/0163633 A1 | 8/2003 | Aasheim |
| 2003/0217080 A1 | 11/2003 | White |
| 2004/0066741 A1 | 4/2004 | Dinker |
| 2004/0103238 A1 | 5/2004 | Avraham |
| 2005/0177672 A1 | 8/2005 | Rao |
| 2005/0195635 A1 | 9/2005 | Conley |
| 2005/0235067 A1 | 10/2005 | Creta |
| 2006/0031709 A1 | 2/2006 | Hiraiwa |
| 2007/0061502 A1 | 3/2007 | Lasser |
| 2007/0101096 A1 | 5/2007 | Gorobets |
| 2007/0283081 A1 | 12/2007 | Lasser |
| 2007/0285980 A1 | 12/2007 | Shimizu |
| 2008/0034154 A1 | 2/2008 | Lee |
| 2008/0065805 A1 | 3/2008 | Wu |
| 2008/0082731 A1 | 4/2008 | Karamcheti |
| 2008/0112238 A1 | 5/2008 | Kim |
| 2008/0301532 A1 | 12/2008 | Uchikawa |
| 2009/0089544 A1 | 4/2009 | Liu |
| 2009/0113219 A1 | 4/2009 | Aharonov |
| 2009/0287956 A1 | 11/2009 | Flynn |
| 2009/0307249 A1 | 12/2009 | Koifman |
| 2009/0310412 A1 | 12/2009 | Jang |
| 2010/0169470 A1 | 7/2010 | Takashige |
| 2010/0217952 A1 | 8/2010 | Iyer |
| 2010/0332922 A1* | 12/2010 | Chang .................... G11C 5/143 |
| | | 714/704 |
| 2011/0055471 A1 | 3/2011 | Thatcher |
| 2011/0099418 A1 | 4/2011 | Chen |
| 2011/0161784 A1 | 6/2011 | Selinger |
| 2011/0191525 A1 | 8/2011 | Hsu |
| 2011/0218969 A1 | 9/2011 | Anglin |
| 2011/0258514 A1 | 10/2011 | Lasser |
| 2011/0299317 A1 | 12/2011 | Shaeffer |
| 2012/0084523 A1 | 4/2012 | Littlefield |
| 2012/0089774 A1 | 4/2012 | Kelkar |
| 2012/0096330 A1 | 4/2012 | Przybylski |
| 2012/0147021 A1 | 6/2012 | Cheng |
| 2012/0159099 A1 | 6/2012 | Lindamood |
| 2012/0159289 A1 | 6/2012 | Piccirillo |
| 2012/0173792 A1 | 7/2012 | Lassa |
| 2012/0210095 A1 | 8/2012 | Nellans |
| 2012/0278579 A1 | 11/2012 | Goss |
| 2012/0284587 A1 | 11/2012 | Yu |
| 2013/0054822 A1 | 2/2013 | Mordani |
| 2013/0061029 A1 | 3/2013 | Huff |
| 2013/0080391 A1 | 3/2013 | Raichstein |
| 2013/0151759 A1 | 6/2013 | Shim |
| 2013/0191601 A1 | 7/2013 | Peterson |
| 2013/0219131 A1 | 8/2013 | Alexandron |
| 2013/0238955 A1 | 9/2013 | D Abreu |
| 2014/0006688 A1* | 1/2014 | Yu .................... G06F 12/0246 |
| | | 711/103 |
| 2014/0019650 A1 | 1/2014 | Li |
| 2014/0025638 A1 | 1/2014 | Hu |
| 2014/0082273 A1 | 3/2014 | Segev |
| 2014/0095827 A1 | 4/2014 | Wei |
| 2014/0108414 A1 | 4/2014 | Stillerman |
| 2014/0181532 A1 | 6/2014 | Camp |
| 2014/0195564 A1 | 7/2014 | Talagala |
| 2014/0279927 A1 | 9/2014 | Constantinescu |
| 2014/0304452 A1 | 10/2014 | De La Iglesia |
| 2015/0019798 A1 | 1/2015 | Huang |
| 2015/0106559 A1 | 4/2015 | Cho |
| 2015/0121031 A1 | 4/2015 | Feng |
| 2015/0227316 A1 | 8/2015 | Warfield |
| 2015/0234845 A1 | 8/2015 | Moore |
| 2015/0269964 A1 | 9/2015 | Fallone |
| 2015/0277937 A1 | 10/2015 | Swanson |
| 2015/0301964 A1 | 10/2015 | Brinicombe |
| 2015/0304108 A1 | 10/2015 | Obukhov |
| 2015/0347025 A1 | 12/2015 | Law |
| 2015/0363271 A1 | 12/2015 | Haustein |
| 2016/0014039 A1 | 1/2016 | Reddy |
| 2016/0026575 A1 | 1/2016 | Samanta |
| 2016/0041760 A1* | 2/2016 | Kuang ................ G11C 16/3495 |
| | | 711/103 |
| 2016/0048341 A1 | 2/2016 | Constantinescu |
| 2016/0077968 A1* | 3/2016 | Sela .................... G06F 12/0246 |
| | | 711/118 |
| 2016/0098350 A1* | 4/2016 | Tang .................... G06F 12/0871 |
| | | 711/103 |
| 2016/0154601 A1 | 6/2016 | Chen |
| 2016/0162187 A1 | 6/2016 | Lee |
| 2016/0179399 A1 | 6/2016 | Melik-Martirosian |
| 2016/0203000 A1 | 7/2016 | Parmar |
| 2016/0274636 A1 | 9/2016 | Kim |
| 2016/0306853 A1 | 10/2016 | Sabaa |
| 2016/0342345 A1* | 11/2016 | Kankani ................ G06F 3/0653 |
| 2016/0350385 A1 | 12/2016 | Poder |
| 2016/0364146 A1 | 12/2016 | Kuttner |
| 2017/0010652 A1 | 1/2017 | Huang |
| 2017/0075583 A1 | 3/2017 | Alexander |
| 2017/0075594 A1 | 3/2017 | Badam |
| 2017/0091110 A1 | 3/2017 | Ash |
| 2017/0109199 A1 | 4/2017 | Chen |
| 2017/0109232 A1 | 4/2017 | Cha |
| 2017/0147499 A1 | 5/2017 | Mohan |
| 2017/0161202 A1 | 6/2017 | Erez |
| 2017/0162235 A1 | 6/2017 | De |
| 2017/0177217 A1 | 6/2017 | Kanno |
| 2017/0177259 A1 | 6/2017 | Motwani |
| 2017/0212708 A1 | 7/2017 | Suhas |
| 2017/0220254 A1 | 8/2017 | Warfield |
| 2017/0221519 A1 | 8/2017 | Matsuo |
| 2017/0228157 A1 | 8/2017 | Yang |
| 2017/0249162 A1 | 8/2017 | Tsirkin |
| 2017/0262178 A1 | 9/2017 | Hashimoto |
| 2017/0262217 A1 | 9/2017 | Pradhan |
| 2017/0285976 A1 | 10/2017 | Durham |
| 2017/0286311 A1 | 10/2017 | Juenemann |
| 2017/0344470 A1 | 11/2017 | Yang |
| 2017/0344491 A1 | 11/2017 | Pandurangan |
| 2018/0024779 A1 | 1/2018 | Kojima |
| 2018/0033491 A1 | 2/2018 | Marelli |
| 2018/0052797 A1 | 2/2018 | Barzik |
| 2018/0107591 A1 | 4/2018 | Smith |
| 2018/0143780 A1 | 5/2018 | Cho |
| 2018/0167268 A1 | 6/2018 | Liguori |

(56) References Cited

U.S. PATENT DOCUMENTS

| | | |
|---|---|---|
| 2018/0173620 A1 | 6/2018 | Cen |
| 2018/0189182 A1 | 7/2018 | Wang |
| 2018/0212951 A1 | 7/2018 | Goodrum |
| 2018/0232151 A1 | 8/2018 | Badam |
| 2018/0270110 A1 | 9/2018 | Chugtu |
| 2018/0293014 A1 | 10/2018 | Ravimohan |
| 2018/0300203 A1 | 10/2018 | Kathpal |
| 2018/0329776 A1 | 11/2018 | Lai |
| 2018/0356992 A1 | 12/2018 | Lamberts |
| 2018/0373428 A1 | 12/2018 | Kan |
| 2018/0373655 A1 | 12/2018 | Liu |
| 2018/0373664 A1 | 12/2018 | Vijayrao |
| 2019/0012111 A1 | 1/2019 | Li |
| 2019/0073262 A1 | 3/2019 | Chen |
| 2019/0087115 A1 | 3/2019 | Li |
| 2019/0171532 A1 | 6/2019 | Abadi |
| 2019/0205206 A1 | 7/2019 | Hornung |
| 2019/0227927 A1 | 7/2019 | Miao |
| 2019/0272242 A1 | 9/2019 | Kachare |
| 2019/0339998 A1 | 11/2019 | Momchilov |
| 2019/0377632 A1 | 12/2019 | Oh |
| 2019/0377821 A1 | 12/2019 | Pleshachkov |
| 2019/0391748 A1 | 12/2019 | Li |
| 2020/0004456 A1 | 1/2020 | Williams |
| 2020/0004674 A1 | 1/2020 | Williams |
| 2020/0097189 A1* | 3/2020 | Tao .................. G06F 3/0619 |

OTHER PUBLICATIONS

Yang, T. Wu, H., and W. Sun, "GD-FTL: Improving the Performance and Lifetime of TLC SSD by Downgrading Worn-out Blocks," IEEE 37th International Performance Computing and Communications Conference (IPCCC), 2018.*

Tsuchiya, Yoshihiro et al. "DBLK: Deduplication for Primary Block Storage", MSST 2011, Denver, CO, May 23-27, 2011 pp. 1-5.

Chen Feng, et al. "CAFTL: A Content-Aware Flash Translation Layer Enhancing the Lifespan of Flash Memory based Solid State Devices" < FAST '11, San Jose, CA Feb. 15-17, 2011, pp. 1-14.

Wu, Huijun et al. "HPDedup: A Hybrid Prioritized Data Deduplication Mechanism for Primary Storage in the Cloud", Cornell Univ. arXiv: 1702.08153v2[cs.DC], Apr. 16, 2017, pp. 1-14.

WOW: Wise Ordering for Writes—Combining Spatial and Temporal Locality in Non-Volatile Caches by Gill (Year: 2005).

Helen H. W. Chan et al. "HashKV: Enabling Efficient Updated in KV Storage via Hashing", https://www.usenix.org/conference/atc18/presentation/chan, (Year: 2018).

Ivan Picoli, Carla Pasco, Bjorn Jonsson, Luc Bouganim, Philippe Bonnet. "uFLIP-OC: Understanding Flash I/O Patterns on Open-Channel Solid-State Drives." APSys'17, Sep. 2017, Mumbai, India. pp. 1-7, 2017, <10.1145/3124680.3124741>. <hal-01654985>.

EMC Powerpath Load Balancing and Failover Comparison with native MPIO operating system solutions. Feb. 2011.

S. Hong and D. Shin, "NAND Flash-Based Disk Cache Using SLC/MLC Combined Flash Memory," 2010 International Workshop on Storage Network Architecture and Parallel I/Os, Incline Village, NV, 2010, pp. 21-30.

Arpaci-Dusseau et al. "Operating Systems: Three Easy Pieces", Originally published 2015; Pertinent: Chapter 44; flash-based SSDs, available at http://pages.cs.wisc.edu/~remzi/OSTEP/.

Jimenex, X., Novo, D. and P. Ienne, "Pheonix:Reviving MLC Blocks as SLC to Extend NAND Flash Devices Lifetime," Design, Automation & Text in Europe Conference & Exhibition (Date), 2013.

\* cited by examiner

METHOD AND SYSTEM FOR ONLINE CONVERSION OF BAD BLOCKS FOR IMPROVEMENT OF PERFORMANCE AND LONGEVITY IN A SOLID STATE DRIVE

BACKGROUND

Field

This disclosure is generally related to the field of data storage. More specifically, this disclosure is related to a method and system of online conversion of bad blocks for improvement of performance and longevity in a solid state drive.

Related Art

The proliferation of the Internet and e-commerce continues to create a vast amount of digital content. Various distributed storage systems have been created to access and store such digital content. A storage system can include volatile memory (e.g., dynamic random access memory (DRAM)) and multiple drives (e.g., a solid state drive (SSD) or a hard disk drive (HDD)). A drive can include non-volatile memory in a physical storage medium for persistent storage, such as Not-And (NAND) flash in an SSD. In the NAND flash of an SSD, data can generally be read and programmed in units of pages (typically between 4 KB and 16 KB in size), but can only be erased in units of blocks consisting of multiple pages (typically on the order of MBs). Furthermore, NAND flash cannot support an in-place over-write.

NAND flash memory can store a certain number of bits per cell. For example: a single-level cell (SLC) memory element can store one bit of information per cell; a multi-level cell (MLC) memory element can store two bits of information per cell; a triple-level cell (TLC) memory element can store three bits of information per cell; and a quad-level cell (QLC) memory element can store four bits of information per cell.

As the number of bits per cell increases, so decreases the cost of the associated SSD as well as the endurance. That is, as the density and capacity of memory elements continues to increase (e.g., three-dimensional stacking and inserting more bits in one NAND cell, such as QLC), the process variation of current NAND memory may result in a decreased or weakened data retention. This can result in an increased number of bad blocks, which can lead to a decreased efficiency, increased wear-leveling, and a shorter lifespan for the SSD.

One solution to handling the increased number of bad blocks in NAND flash memory is providing additional space which is not visible to the host, i.e., "redundant blocks" or "overprovisioning." If the system detects a bad block, the number of redundant blocks decreases. As a result, the overprovisioned space is reduced, which can trigger a more frequent garbage collection and can result in a reduced latency and a reduced input/output per second (IOPS). Furthermore, the write amplification may increase, which can result in an increased burden on the NAND flash. This in turn can lead to more bad blocks, and the recursive feedback can accelerate the wear-leveling of the SSD.

Thus, in current storage drives, the solution for handling the increased number of bad blocks can result in several shortcomings, which can decrease the overall performance and efficiency of a storage system.

SUMMARY

One embodiment facilitates data placement. During operation, the system monitors a condition of a plurality of blocks of a non-volatile memory. The system determines that a condition of a first block falls below a first predetermined threshold, wherein the first block has a first capacity. The system formats the first block to obtain a second block which has a second capacity, wherein the second capacity is less than the first capacity. In some embodiments, the first capacity corresponds to a first number of bits per cell, the second capacity corresponds to a second number of bits per cell, and the second number is less than the first number. The first block stores the first number of bits per cell, and the second block stores the second number of bits per cell.

In some embodiments, the system determines that a condition of the second block falls below a second predetermined threshold. The system formats the second block to obtain a third block which has a third capacity, wherein the third capacity is less than the second capacity. In some embodiments, the second capacity corresponds to a second number of bits per cell, the third capacity corresponds to a third number of bits per cell, and the third number is less than the second number. The third block stores the third number of bits per cell.

In some embodiments, the system determines that a condition of the third block or the condition of the first or second block falls below a third predetermined threshold. The system formats the first, second, or third block to obtain a fourth block which has the third capacity and comprises a non-volatile cache of the non-volatile memory. In some embodiments, the third capacity corresponds to the third number of bits per cell, and the fourth block stores the third number of bits per cell.

In some embodiments, the system flushes data stored in the non-volatile cache directly to an available block of the non-volatile memory without the controller decoding or encoding the data.

In some embodiments, prior to formatting the first, second, or third block, the system reads out data stored in the first, second, or third block to be stored in a data buffer.

In some embodiments, the non-volatile memory comprises: a first type of storage with blocks which have the first capacity and store a first number of bits per cell, wherein the first number is four; a second type of storage with blocks which have the second capacity and store a second number of bits per cell, wherein the second number is two; a third type of storage with blocks which have the third capacity and store a third number of bits per cell, wherein the third number is one; and the non-volatile cache, which has the third capacity and further stores data of an inconsistent or irregular size.

In some embodiments, the system manages, by a flash translation layer module, a mapping table of logical addresses to physical addresses across the first, second, and third types of storage of the non-volatile memory.

In some embodiments, monitoring the condition of the plurality of blocks of the non-volatile memory further comprises generating a score for each block by dynamically assessing the condition of each block.

BRIEF DESCRIPTION OF THE FIGURES

In the figures, like reference numerals refer to the same figure elements.

DETAILED DESCRIPTION

Figure 1:
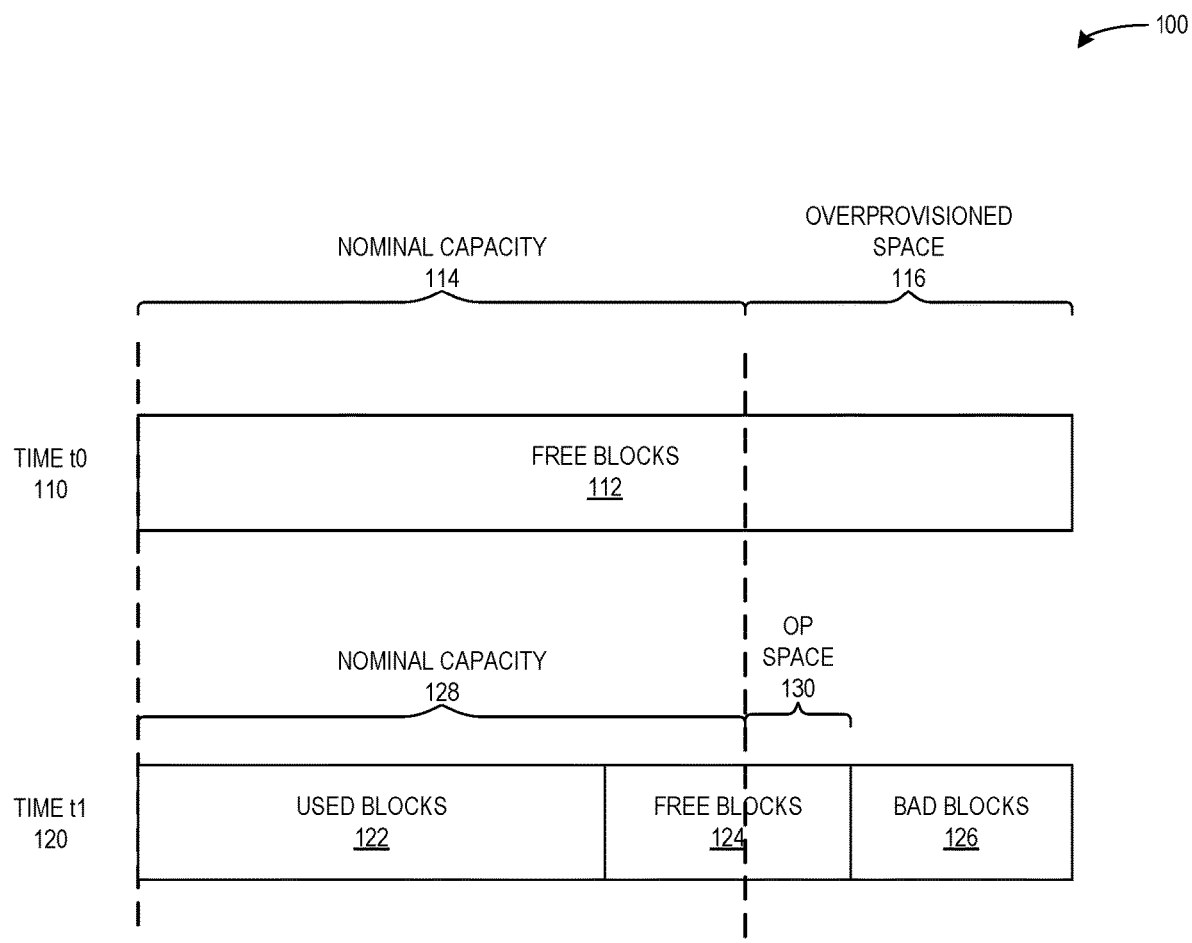
FIG. 1 illustrates an exemplary use of redundant blocks or overprovisioning, in accordance with the prior art.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the embodiments described herein are not limited to the embodiments shown, but are to be accorded the widest scope consistent with the principles and features disclosed herein.

Overview

The embodiments described herein solve the problem of handling the increasing number of bad blocks by monitoring the condition of a plurality of blocks, and, upon detecting a certain threshold condition, formatting at least one of the blocks to store a fewer number of bits per cell.

As described above, as the density and capacity of memory elements continues to increase (e.g., three-dimensional stacking and inserting more bits in one NAND cell, such as QLC), the process variation of current NAND memory may result in a decreased or weakened data retention. This can result in an increased number of bad blocks, which can lead to a decreased efficiency, increased wear-leveling, and a shorter lifespan for the SSD.

One solution to handling the increased number of bad blocks in NAND flash memory is by providing "redundant blocks" which are not visible to the host, i.e., "overprovisioning," as described below in relation to FIG. 1. However, when the system detects a bad block, the overprovisioned space is reduced, which can trigger a more frequent garbage collection and can result in a reduced latency and a reduced input/output per second (IOPS). Furthermore, the write amplification may increase, which can result in an increased burden on the NAND flash. This in turn can lead to more bad blocks, and the recursive feedback can accelerate the wear-leveling of the SSD.

Thus, in current storage drives, the solution for handling the increased number of bad blocks can result in several shortcomings, which can decrease the overall performance and efficiency of a storage system.

The embodiments described herein address these challenges by providing a system which monitors the condition of a plurality of blocks in the non-volatile memory of a storage drive (e.g., in an SSD), and formats or "downgrades" a block if the condition of the block falls below a certain threshold. If the condition of a first block falls below a first predetermined threshold, the system formats the first block to obtain a second block with fewer bits per cell than the first block. If the condition of the second block falls below a second predetermined threshold, the system formats the second block to obtain a third block with fewer bits per cell than the second block. If the condition of the first, second, or third block falls below a third predetermined threshold, the system formats the first, second, or third block to obtain a fourth block which serves as a non-volatile cache of the non-volatile memory.

As an example, all free blocks can initially be QLC NAND blocks. The first block can be formatted as a QLC NAND block, and subsequently downgraded to the second block. The second block can be formatted as an MLC NAND block, and subsequently downgraded to the third block. The third block can be formatted as an SLC NAND block, and subsequently downgraded to the fourth block. The fourth block can be formatted as an SLC cache which can store data of an irregular size. The first and second blocks can also be directly downgraded to the fourth block (e.g., from a QLC or MLC NAND block to an SLC cache). An exemplary environment which includes these four types of storage is described below in relation to FIGS. 2 and 4.

Thus, by monitoring the condition of the blocks in an SSD, the system can determine when the condition of a given block does not meet certain thresholds, and can downgrade a block to a format which stores a fewer number of bits per cell. This allows for the utilization of space previously wasted by bad blocks, which can improve the overall performance and efficiency of the storage system and can also improve the longevity of the storage drives in the storage system.

A "storage drive" refers to a device or a drive with a non-volatile memory which can provide persistent storage of data, e.g., a solid state drive (SSD) or a hard disk drive (HDD).

A "storage server" refers to a computing device which can include multiple storage drives. A distributed storage system can include multiple storage servers.

"Downgrading" a portion of memory refers to formatting a given block to obtain another block which stores a fewer number of bits per cell than the given block.

An "irregular capacity cache" refers to a non-volatile cache which can store data of an irregular size, e.g., not necessarily in chunks, portions, or segments based on a standard unit such as a page or a block. In this disclosure, an example of an irregular capacity cache is an SLC cache.

The term "capacity" can refer to any unit of measure used to quantify how much data can be stored or a manner/mechanism in which data can be stored in a storage drive, including in a physical block or other area/sector/region of a storage drive. One example of capacity is a number of bits per cell.

Exemplary Use of Overprovisioning in the Prior Art

FIG. 1 illustrates an exemplary use of redundant blocks or overprovisioning in a storage device 100, in accordance with the prior art. At a time t0 110, an area of memory in SSD 100 can include free blocks 112, which can include a nominal capacity 114 and an overprovisioned space 116. In general, overprovisioned (OP) space is not visible to the host. As an example, given an SSD with 5 Terabyte (TB) capacity, nominal capacity 114 can comprise 4 TBs, while overprovisioned space 116 can comprise 1 TB. During operation, the system may mark certain blocks as bad (e.g., based on a hardware or a software related issue).

Thus, at a time t1 120, the same area of memory in SSD 100 can include used blocks 122, free blocks 124, and bad blocks 126. A nominal capacity 128 at time t1 120 remains the same as nominal capacity 114 at time t0, but nominal capacity 128 now includes both used blocks 122 and a portion of free blocks 124. Furthermore, at time t1 120, OP space 130 has decreased in comparison to OP space 116 at time t0 110 due to bad blocks 126 "squeezing" the number of redundant blocks in prior OP space 116, such that OP space 130 now includes only a much smaller portion of free blocks 124 (which portion is significantly smaller than the portion of free blocks 112 previously available as part of OP space 116).

Thus, the overprovisioning of space for redundant blocks in current storage systems and drives to handle the increasing number of bad blocks results in a system which can limit the reliability, performance, and efficiency for the overall system. Furthermore, the increased wear-leveling of the physical NAND can affect the total cost of ownership (TCO) of an overall storage system.

Figure 2:
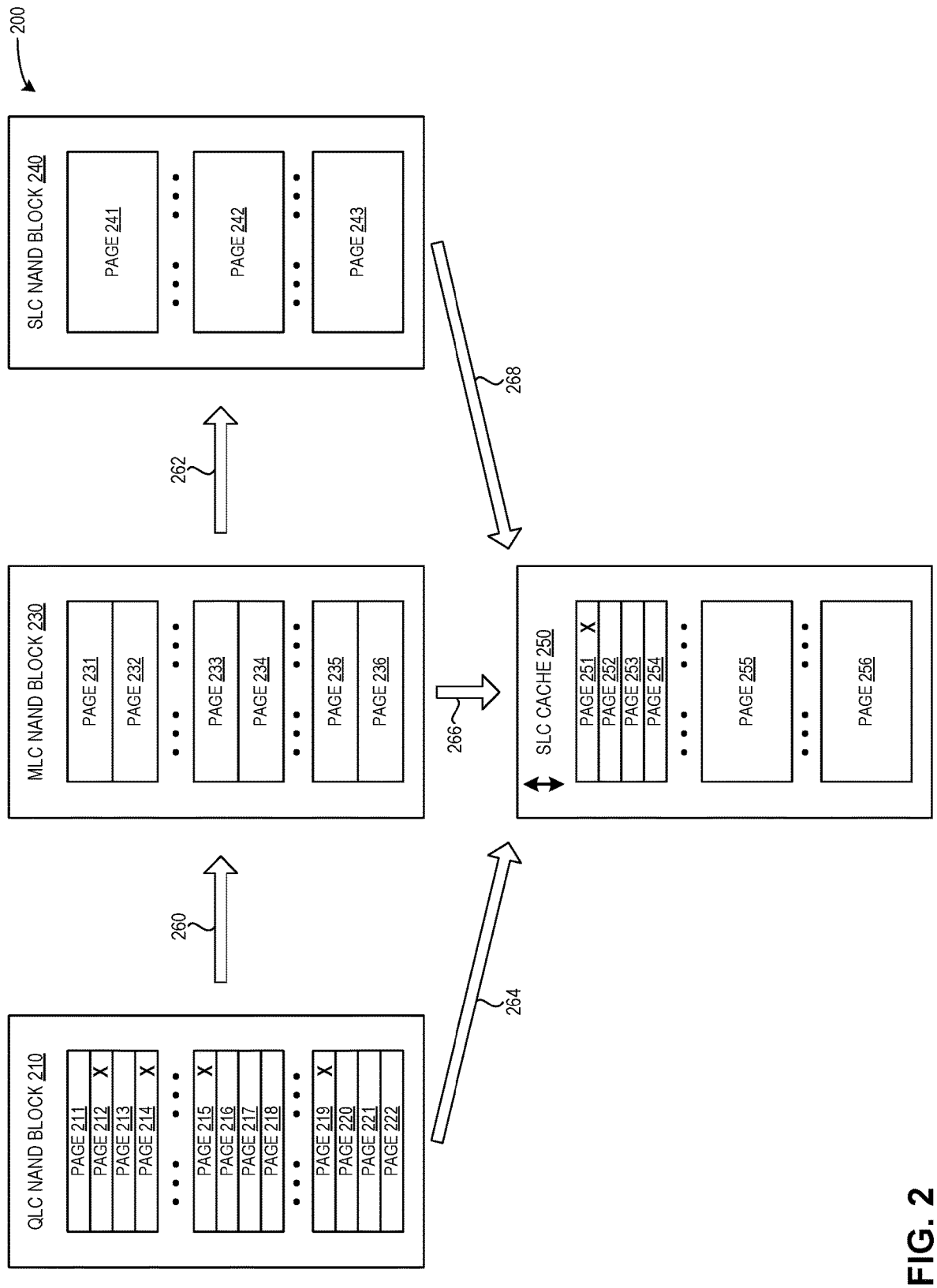
FIG. 2 illustrates an exemplary environment which facilitates data placement, including formatting monitored blocks to store a fewer number of bits per cell, in accordance with an embodiment of the present application.

Exemplary Environment for Facilitating Data Placement: Monitoring and Formatting Blocks to Store a Fewer Number of Bits Per Cell FIG. 2 illustrates an exemplary environment 200 which facilitates data placement, including formatting monitored blocks to store a fewer number of bits per cell, in accordance with an embodiment of the present application. Environment 200 can include several "types" of non-volatile memory (depicted as blocks) for persistent storage, such as: a QLC NAND block 210; an MLC NAND block 230; an SLC NAND block 240; and an SLC cache 250. Each type of block can include memory elements which store a certain number of bits per cell. In QLC NAND block 210, each cell can store four bits per cell; in MLC NAND block 230, each cell can store two bits per cell; in SLC NAND block 240, each cell can store one bit per cell; and in SLC cache 250, each cell can store one bit per cell.

During operation, all free blocks may begin as QLC NAND blocks. One physical word line can be coupled with four pages. The system can monitor the health or condition of the blocks of the non-volatile memory, e.g., by monitoring a predetermined requirement for completing an input/output request, a programming operation, or a read operation. The system can also monitor the health or condition of the blocks based on a variety of factors, including but not limited to: a failed cyclic redundancy check (CRC) or error correction code (ECC) check; a number of unreadable pages in a given block; a number of program/erase cycles for a given block; and defective manufacturing or a detected physical issue. For example, in QLC NAND block 210, pages 212, 214, 215 and 219 may be monitored and marked as bad pages (depicted by the "X" in QLC NAND block 210 next to those pages). The system can determine to mark a page as bad based on a certain predetermined threshold, e.g., based on a respective page being unreadable or on a time exceeding a predetermined threshold for completing an I/O request associated with a respective page.

If the condition of a first block falls below a first predetermined threshold, the system can read out the data from the first block, store that read-out data temporarily in a data buffer or other available block, and "downgrade" (arrow 260) the first block by formatting the first block to obtain a second block which stores a fewer number of bits per cell than the first block.

The system can continue to monitor the blocks of the non-volatile memory. If the condition of the second block falls below a second predetermined threshold, the system can read out the data from the second block, store that read-out data temporarily in a data buffer or other available block, and further "downgrade" (arrow 262) the second block by formatting the second block to obtain a third block which stores a fewer number of bits per cell than the second block.

The system can continue to monitor the blocks of the non-volatile memory, including blocks in QLC NAND block 210, MLC NAND block 230, and SLC NAND block 240. If the condition of a given block (e.g., the first, second, or third block) falls below a third predetermined threshold, the system can read out the data from the given block, store that read-out data temporarily in a data buffer or other available block, and "downgrade" (arrows 264, 266, and 268) the given block by formatting the given block to obtain a fourth block which serves as a non-volatile cache of the non-volatile memory. Note that this downgrade to the format of an SLC cache can occur directly from a block formatted as a QLC NAND block 210 (via arrow 264), directly from a block formatted as an MLC NAND block 230 (via arrow 266), or from SLC NAND block 240, e.g., the third block (via arrow 268).

Thus, a first type of "downgrade" can include formatting the first block (e.g., a QLC NAND block) to obtain the second block (e.g., an MLC NAND block). A second type of "downgrade" can include formatting the second block (e.g., the MLC NAND block) to obtain the third block (e.g., an SLC NAND block). A third type of "downgrade" to an SLC cache can include formatting any block (e.g., the first block, the second block, or the third block) to obtain a fourth block (e.g., an SLC cache block). While these downgrades are described as associated with specific types of storage, a downgrade can also refer to formatting (or re-formatting) an area of memory to store a fewer number of bits per cell than prior to such formatting or re-formatting.

Figure 3:
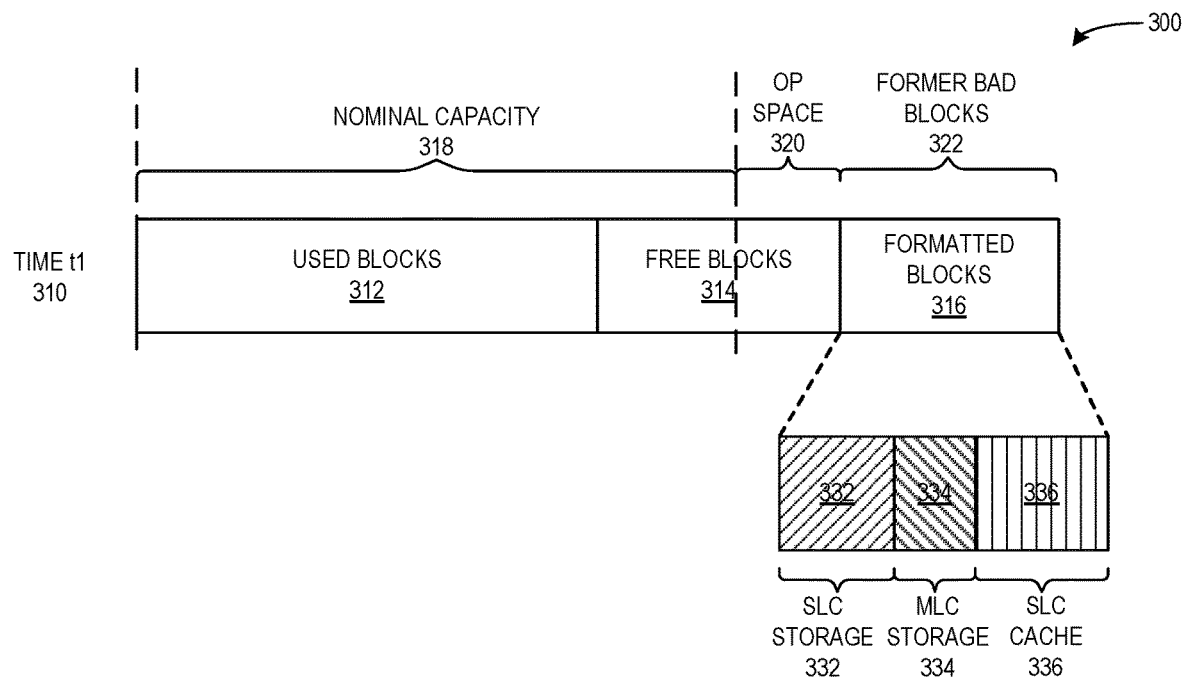
FIG. 3 illustrates an exemplary utilization of the former bad blocks of FIG. 1 based on monitored and formatted blocks, in accordance with an embodiment of the present application.

FIG. 3 illustrates an exemplary utilization of former bad blocks of a storage device 300 based on monitored and formatted blocks, in accordance with an embodiment of the present application. At a time t0 310, an area of memory in SSD 300 can include used blocks 312, free blocks 314, and formatted blocks 316 (which corresponds to an area of memory previously occupied by former bad blocks 322). At time t0 310, a nominal capacity 318 can include both used blocks 122 and a portion of free blocks 124, while an OP space 320 can include a portion of free blocks 314. In FIG. 3, instead of losing or wasting the prior OP space to bad blocks (denoted as former bad blocks 322), the system can perform an online conversion and utilize this space by storing data as formatted blocks 316, in three additional formats, based on the various downgrades described above in relation to FIG. 2. For example, formatted blocks 316 can include: an SLC storage 332 depicted with diagonally right-slanting lines; an MLC storage 334 depicted with diagonally left-slanting lines; and an SLC cache 336 depicted with vertical lines.

Thus, FIG. 3 depicts how formatted blocks 316 can utilize the area in memory previously occupied (and wasted) by former bad blocks 322. By utilizing this previously wasted space, the embodiments described herein can perform an online conversion which results in a system with an improved efficiency, performance, and lifespan.

Figure 4:
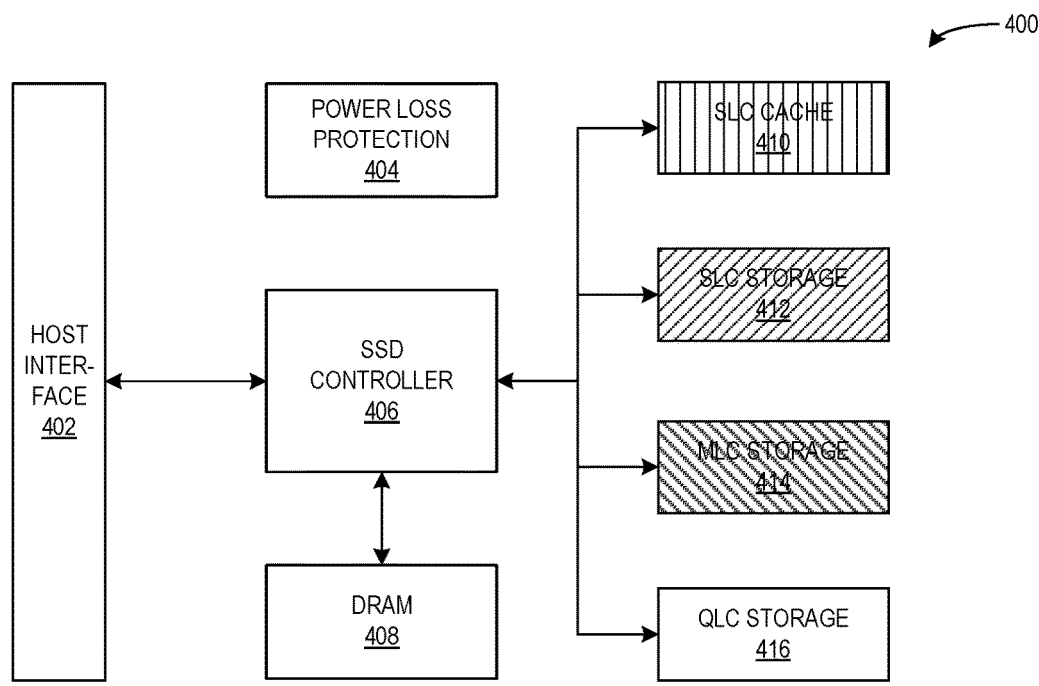
FIG. 4 illustrates an exemplary environment which facilitates data placement, including four types of storage of non-volatile memory, in accordance with an embodiment of the present application.

FIG. 4 illustrates an exemplary environment 400 which facilitates data placement, including four types of storage of non-volatile memory, in accordance with an embodiment of the present application. Environment 400 can comprise an SSD, which includes: a host interface 402; a power loss protection module 404; an SSD controller 406; a DRAM 408; and several types of persistent storage, including an SLC cache 410, an SLC storage 412, an MLC storage 414, and a QLC storage 416. SSD controller 406 can communicate with a host via host interface 402, and can be coupled to DRAM 408. SSD controller 406 can also handle processing data and communicating with a channel management module (not shown) to both access data stored in the persistent storage and format certain blocks based on the various predetermined thresholds and downgrades described above in relation to FIG. 2.

Similar to SLC cache 336 of FIG. 3, SLC cache 410 is depicted with vertical lines. Similar to SLC storage 332 of FIG. 3, SLC storage 412 is depicted with diagonally right-slanting lines. Similar to MLC storage 334 of FIG. 3, MLC storage 414 is depicted with diagonally left-slanting lines. SLC cache 410 and SLC storage 412 can be used not only for executing a read/write operation from the host, but also for internal traffic such as garbage collection. Rather than open a new block for a small data chunk from the host or for garbage collection, the system can use SLC cache 410 and SLC storage 412 as a middle layer to merge small data chunks with the desired non-volatile property.

Furthermore, as described above: data stored in QLC storage 416 can be stored in cells which store four bits per cell; data stored in MLC storage 414 can be stored in cells which store two bits per cell; data stored in SLC storage 412 can be stored in cells which store one bit per cell; and data stored in SLC cache 410 can be stored in cells which store one bit per cell.

Exemplary Environment for Direct Block Flush without Involving Controller

Figure 5:
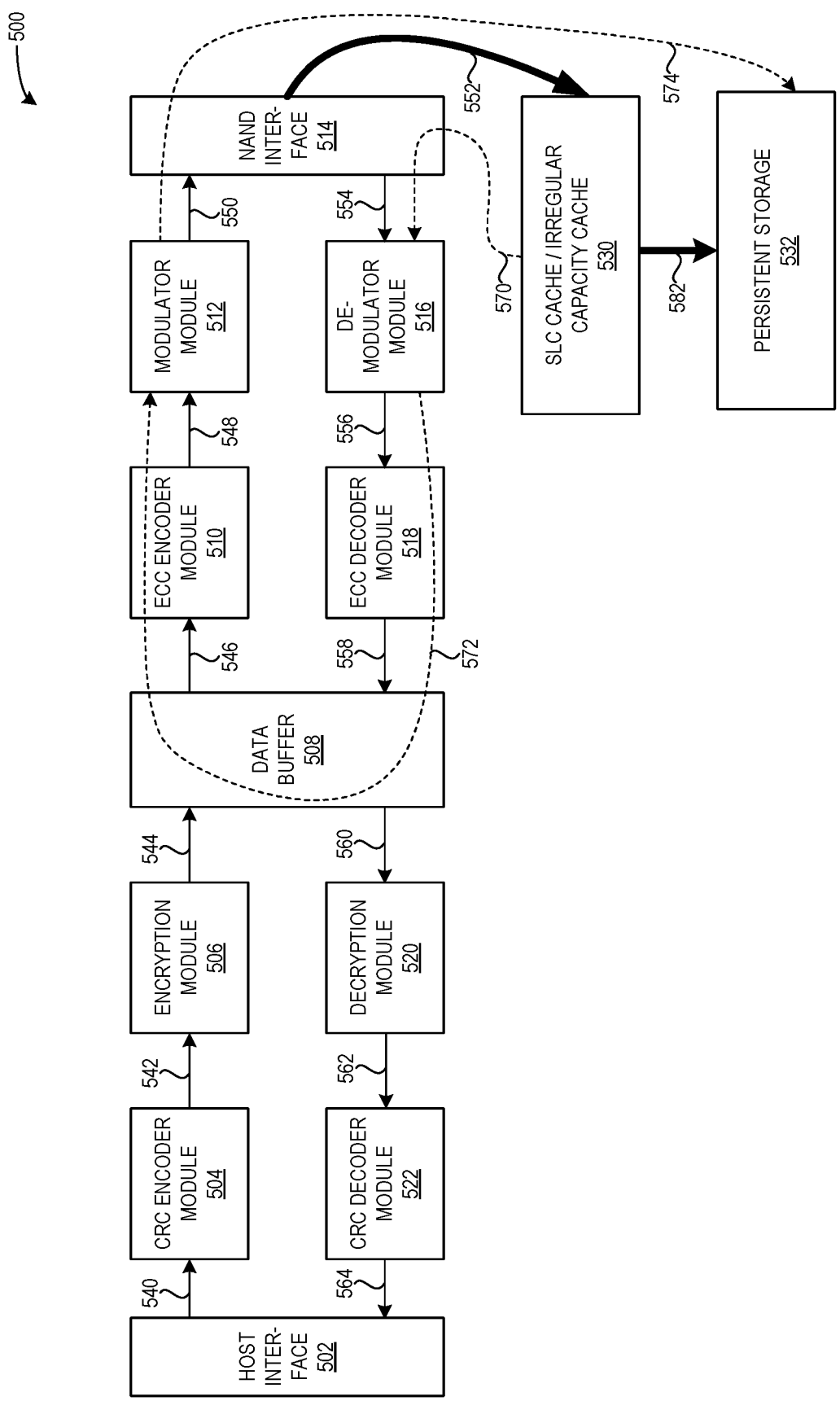
FIG. 5 illustrates an exemplary environment for facilitating a direct block flush from a non-volatile cache to persistent storage without the controller decoding or encoding the data, in accordance with an embodiment of the present application.

FIG. 5 illustrates an exemplary environment 500 for facilitating a direct block flush from a non-volatile cache to persistent storage without the controller decoding or encoding the data, in accordance with an embodiment of the present application. Environment 500 can depict an SSD, with a host interface 502, a NAND interface 514, and various controller functionality performed by components or modules of the SSD controller. In executing a write operation (such as a host write), the system can receive data from host interface 502. A cyclic redundancy check (CRC) encoder module 504 can receive the data (via a communication 540), perform a CRC encoding, and pass the data to an encryption module 506. Encryption module 506 can receive the CRC-encoded data (via a communication 542), encrypt the data, and pass the encrypted data to a data buffer 508 (via a communication 544). The data can then be sent to an error correction encoding (ECC) encoder module 510 (via a communication 546). ECC encoder module 510 can perform ECC-encoding on the data and pass the ECC-encoded data to a modulator module 512. Modulator module 512 can receive the ECC-encoded data (via a communication 548), perform a modulation on the data, and pass the modulated data to persistent storage via NAND interface 514 (via a communication 550). The data can be stored in persistent storage, e.g., in an SLC cache/irregular capacity cache 530 (via a communication 552) or in a persistent storage 532 (via a communication 574). Persistent storage 532 can include various types of storage which differ based on the number of bits per cell that can be stored in a block of a given type of storage, as described above in relation to FIGS. 2, 3, and 4.

In executing a read operation (such as a host read), the system can retrieve the data from persistent storage via NAND interface 514, and pass the retrieved data to a de-modulator module 516. De-modulator module 516 can receive the data (via a communication 554), perform a de-modulation on the data, and pass the de-modulated data to an ECC decoder module 518. ECC decoder module 518 can receive the de-modulated data (via a communication 556), perform ECC-decoding on the data, and pass the ECC-decoded data to data buffer 508 (via a communication 558). The data can then be sent to a decryption module 520 (via a communication 560). Decryption module 520 can decrypt the data and pass the decrypted data to a CRC decoder module 522. CRC decoder module 522 can receive the decrypted data (via a communication 562), perform a CRC decoding, and pass the CRC-decoded data to host interface 502 (via a communication 564), to be sent back to the host.

From time to time, or at a predetermined periodic interval, the system may flush data from SLC cache 530 to persistent storage 532. The various components or modules of the SSD controller may also be involved in copying data between NAND pages. The system can achieve this data flushing by reading out data from a first location in the NAND flash, decoding the read-out data to obtain error-free data (e.g., performing ECC decoding), encoding the data (e.g., performing ECC encoding), and writing the data back to a second location in the NAND flash (as depicted by the data path shown in the dashed lines of communications 570, 572, and 574). However, when the controller is handling and processing a large amount of data, this data path can result in a performance bottleneck.

The embodiments described herein solve this performance bottleneck by relying on the low raw error rate of the SLC cache. In comparison to the data quality of QLC NAND, the data quality of the SLC cache is much higher. The system can use an improved and more efficient data path, by temporarily holding and merging error-free data from the controller in SLC cache 530, and then directly flushing data stored in SLC cache 530 without the controller having to process the data, e.g., by decoding or encoding the data, or going through any of the controller's codecs. This improved "fast path" is depicted by the heavy arrows of communications 552 and 582.

SLC cache 530 can maintain a highly separated threshold voltage distribution, and consequently, the read/sense procedure can be quick and straightforward, resulting in the low raw error rate. Furthermore, the low raw error rate allows the system to directly write the data from SLC cache 530 to persistent storage 532 (which can be, e.g., QLC NAND, MLC NAND, or SLC NAND). Any errors can be subsequently fixed when the data is read out from persistent storage 532.

Figure 6A:
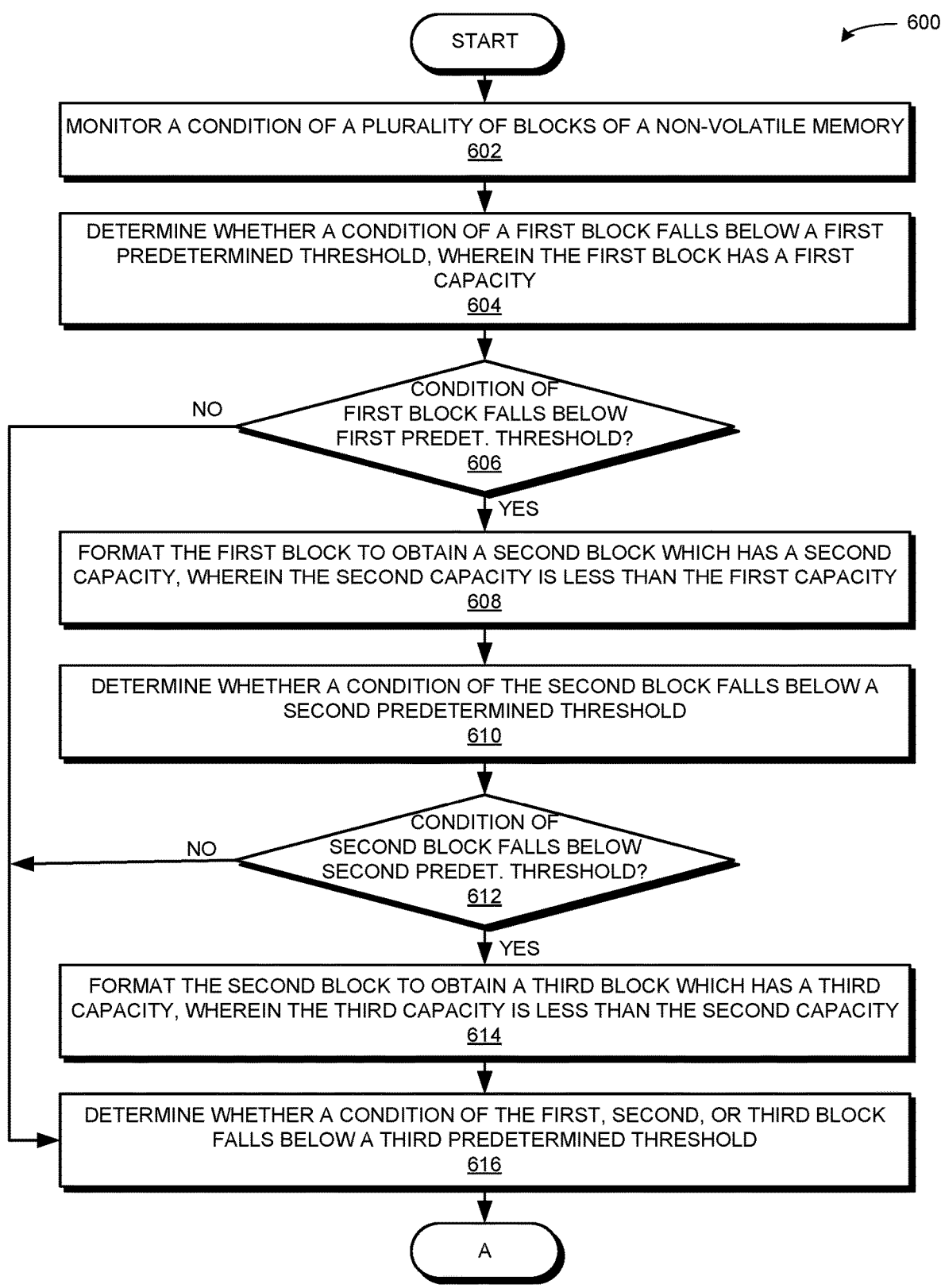
FIG. 6A presents a flowchart illustrating a method for facilitating data placement, in accordance with an embodiment of the present application.

Exemplary Method for Facilitating Data Placement Based on Online Bad Block Conversion FIG. 6A presents a flowchart 600 illustrating a method for facilitating data placement, in accordance with an embodiment of the present application. During operation, the system monitors a condition of a plurality of blocks of a non-volatile memory (operation 602). The system can monitor the condition by generating a score for each block by dynamically assessing the condition of each block, based on a variety of factors, including but not limited to: a failed CRC or ECC check; a number of unreadable pages in a given block; a number of program/erase cycles for a given block; and defective manufacturing or a detected physical issue. The system can use the generated score to determine whether the condition of a block falls below a certain predetermined threshold.

The system determines whether a condition of a first block falls below a first predetermined threshold, wherein the first block has a first capacity (operation 604). The first block having a first capacity can correspond to the first block storing a first number of bits per cell. If the condition of the first block does not fall below the first predetermined threshold (decision 606), the operation continues at operation 616. If the condition of the first block does fall below the first predetermined threshold (decision 606), the system formats the first block to obtain a second block which has a second capacity, wherein the second capacity is less than the first capacity (operation 608). The second block having a second capacity can correspond to the second block storing a second number of bits per cell, and the second number can be less than the first number.

The system determines whether a condition of the second block falls below a second predetermined threshold (operation 610). If the condition of the second block does not fall below the second predetermined threshold (decision 612), the operation continues at operation 616. If the condition of the second block does fall below the second predetermined threshold (decision 612), the system formats the second block to obtain a third block which has a third capacity, wherein the third capacity is less than the second capacity (operation 614). The third block having the third capacity can correspond to the third block storing a third number of bits per cell, wherein the third number is less than the second number.

The system determines whether a condition of the first, second, or third block falls below a third predetermined threshold (operation 616), and the operation continues at Label A of FIG. 6B.

Figure 6B:
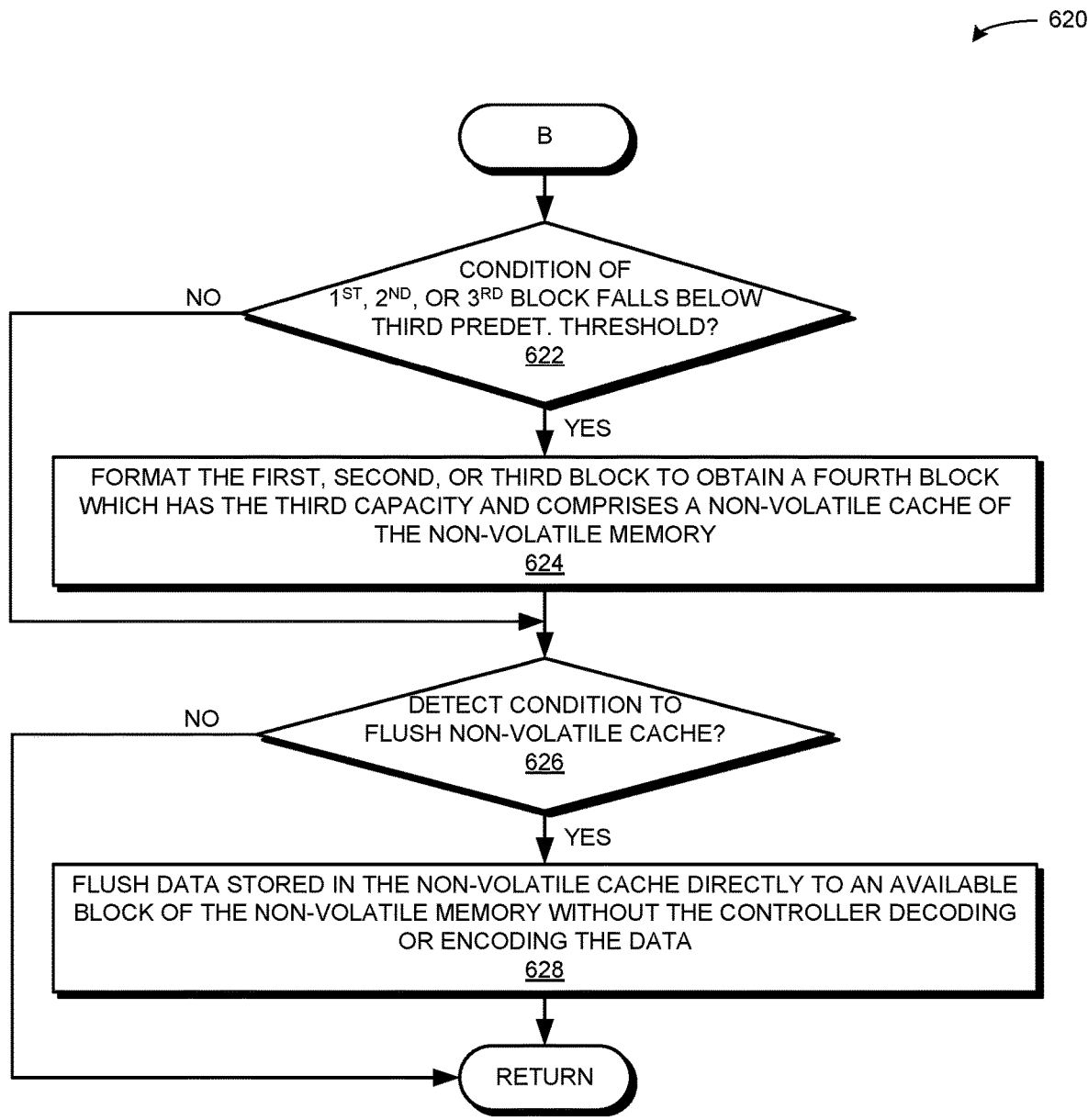
FIG. 6B presents a flowchart illustrating a method for facilitating data placement, in accordance with an embodiment of the present application.

FIG. 6B presents a flowchart 620 illustrating a method for facilitating data placement, in accordance with an embodiment of the present application. During operation, if the condition of the first, second, or third block falls below the third predetermined threshold (decision 622), the system formats the first, second, or third block to obtain a fourth block which has the third capacity and comprises a non-volatile cache of the non-volatile memory (operation 624). The non-volatile cache can be an SLC cache, and the non-volatile memory can further comprise a QLC storage, an MLC storage, and an SLC storage. The fourth block or the non-volatile cache can store the third number of bits per cell. Furthermore, prior to formatting the first, second, or third block, the system can read out data stored in the first, second, or third block to be stored in a data buffer or a cache (and eventually written back to persistent storage).

If the condition of the first, second, or third block does not fall below the third predetermined threshold (decision 622), the operation continues at decision 626. If the system detects a condition to flush the non-volatile cache (decision 626), the system flushes data stored in the non-volatile cache directly to an available block of the non-volatile memory without the controller decoding or encoding the data (operation 628) (as depicted above in relation to communication 582 of FIG. 5). If the system does not detect a condition to flush the non-volatile cache (decision 626), the operation returns.

Exemplary Computer System and Apparatus

Figure 7:
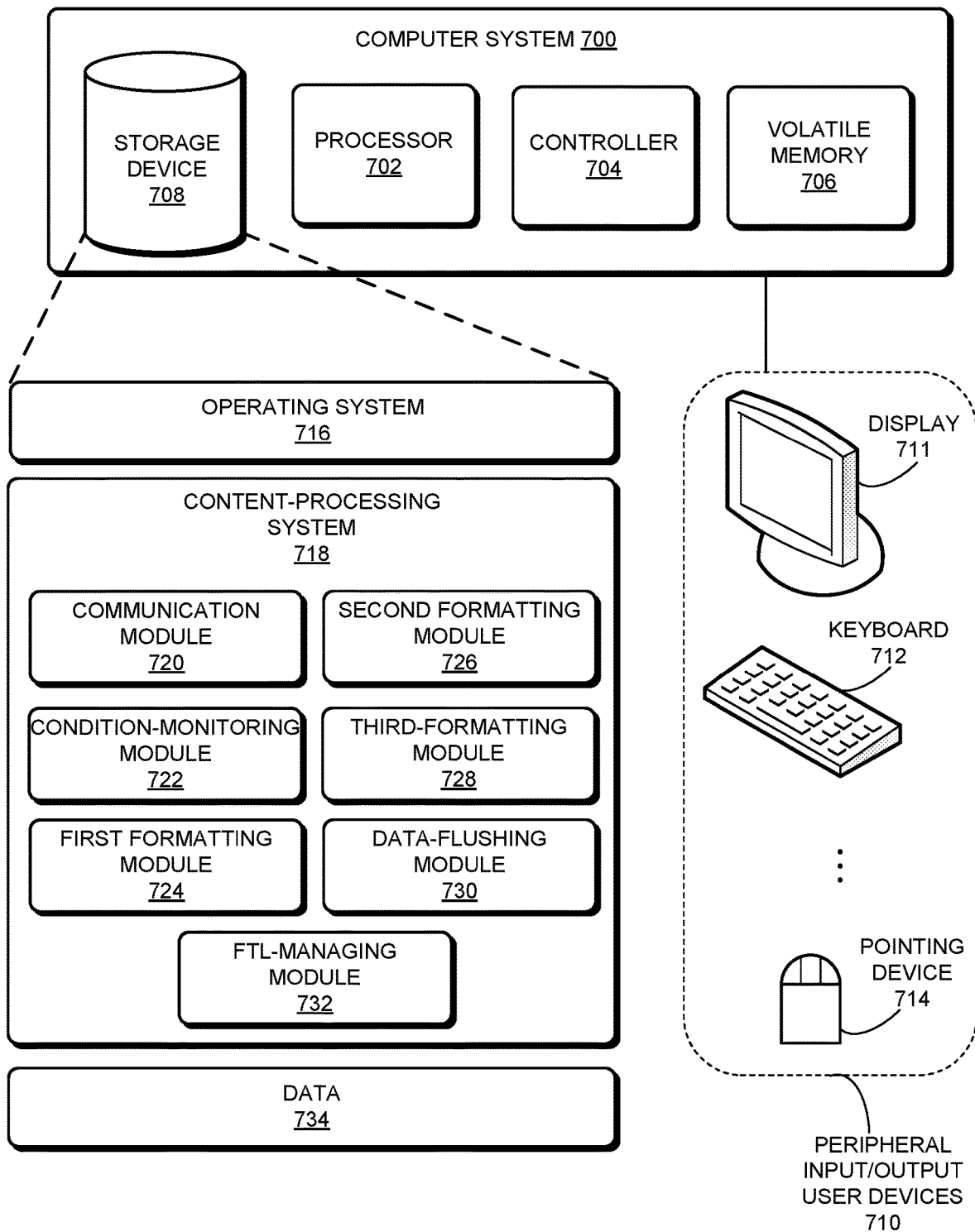
FIG. 7 illustrates an exemplary computer system that facilitates data placement, in accordance with an embodiment of the present application.

FIG. 7 illustrates an exemplary computer system 700 that facilitates data placement, in accordance with an embodiment of the present application. Computer system 700 includes a processor 702, a controller 704, a volatile memory 706, and a storage device 708. Volatile memory 706 can include, e.g., random access memory (RAM), that serves as a managed memory, and can be used to store one or more memory pools. Storage device 708 can include persistent storage which can be managed or accessed via controller 704. Furthermore, computer system 700 can be coupled to peripheral input/output (110) user devices 710, e.g., a display device 711, a keyboard 712, and a pointing device 714. Storage device 708 can store an operating system 716, a content-processing system 718, and data 734.

Content-processing system 718 can include instructions, which when executed by computer system 700, can cause computer system 700 to perform methods and/or processes described in this disclosure. Specifically, content-processing system 718 can include instructions for receiving and transmitting data packets, including data to be read or written, an input/output (I/O) request (e.g., a read request or a write request), and data associated with an I/O request (communication module 720).

Content-processing system 718 can include instructions for monitoring a condition of a plurality of blocks of a non-volatile memory (condition-monitoring module 722). Content-processing system 718 can include instructions for determining that a condition of a first block falls below a first predetermined threshold, wherein the first block has a first capacity (condition-monitoring module 722). Content-processing system 718 can include instructions for formatting the first block to obtain a second block which has a second capacity, wherein the second capacity is less than the first capacity (first formatting module 724). Content-processing system 718 can include instructions for determining that a condition of the second block falls below a second predetermined threshold (condition-monitoring module 722). Content-processing system 718 can include instructions for formatting the second block to obtain a third block which has a third capacity, wherein the third capacity is less than the second capacity (second formatting module 726). Content-processing system 718 can include instructions for determining that a condition of the third block or the condition of the first or second block falls below a third predetermined threshold (condition-monitoring module 722). Content-processing system 718 can include instructions for formatting the first, second, or third block to obtain a fourth block which has the third capacity and comprises a non-volatile cache of the non-volatile memory (third formatting module 728).

Content-processing system 718 can include instructions for flushing data stored in the non-volatile cache directly to an available block of the non-volatile memory without the controller decoding or encoding the data (data-flushing module 730). Content-processing system 718 can include instructions for managing, by a flash translation layer module, a mapping table of logical addresses to physical addresses across the first, second, and third types of storage of the non-volatile memory (FTL-managing module 732).

Data 734 can include any data that is required as input or that is generated as output by the methods and/or processes described in this disclosure. Specifically, data 734 can store at least: data; a request; a read request; a write request; an input/output (I/O) request; data associated with a read request, a write request, or an I/O request; formatted data; a condition of a block; a first, second, and third predetermined threshold; a first, second, and third number of bits per cell; a formatted block; a re-formatted or downgraded block; a QLC block; an MLC block; an SLC block; an SLC cache; a data buffer; an available block; a type of storage; data of an irregular or inconsistent size; a table; a mapping table; a flash translation layer (FTL); an FTL mapping table; and a score.

Figure 8:
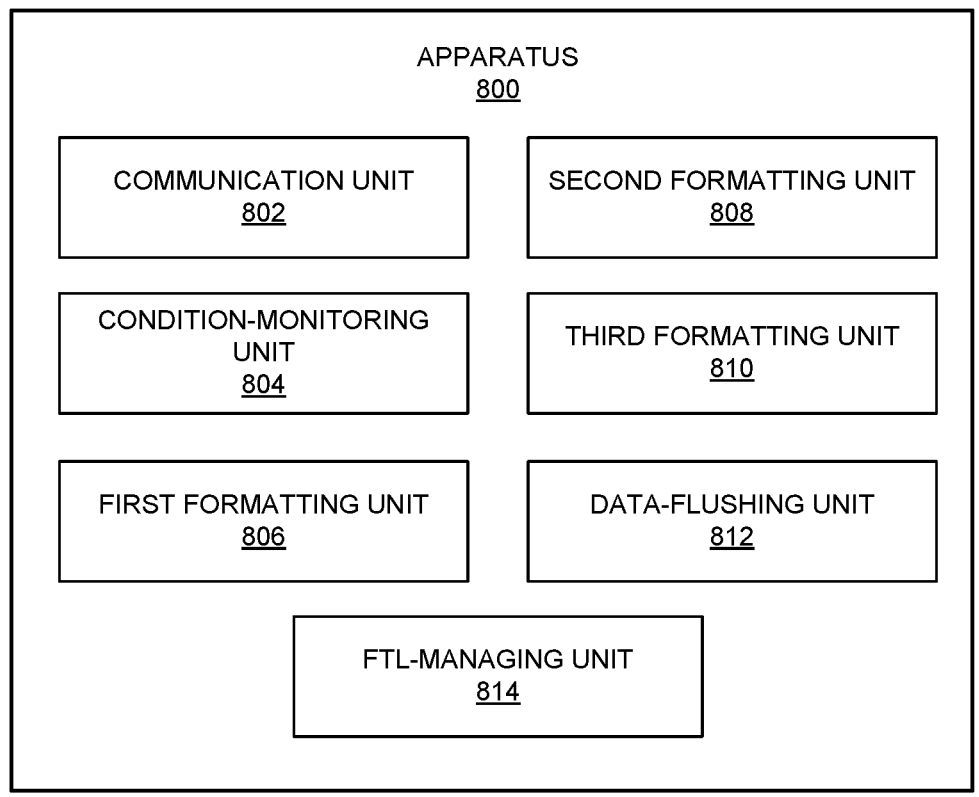
FIG. 8 illustrates an exemplary apparatus that facilitates data placement, in accordance with an embodiment of the present application.

FIG. 8 illustrates an exemplary apparatus 800 that facilitates data placement, in accordance with an embodiment of the present application. Apparatus 800 can comprise a plurality of units or apparatuses which may communicate with one another via a wired, wireless, quantum light, or electrical communication channel. Apparatus 800 may be realized using one or more integrated circuits, and may include fewer or more units or apparatuses than those shown in FIG. 8. Further, apparatus 800 may be integrated in a computer system, or realized as a separate device which is capable of communicating with other computer systems and/or devices. Specifically, apparatus 800 can comprise units 802-814 which perform functions or operations similar to modules 720-732 of computer system 700 of FIG. 7, including: a communication unit 802; a condition-monitoring unit 804; a first formatting unit 806; a second formatting unit 808; a third formatting unit 810; a data-flushing unit 812; and an FTL-managing unit 814.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing embodiments described herein have been presented for purposes of illustration and description only. They are not intended to be exhaustive or to limit the embodiments described herein to the forms disclosed. Accordingly, many modifications and variations will be apparent to practitioners skilled in the art. Additionally, the above disclosure is not intended to limit the embodiments described herein. The scope of the embodiments described herein is defined by the appended claims.

What is claimed is:

1. A computer-implemented method for facilitating data placement, the method comprising:

monitoring a condition of a plurality of blocks of a non-volatile memory;
determining that a condition of a first block falls below a first predetermined threshold, wherein the first block has a first capacity;
formatting the first block to obtain a second block which has a second capacity, wherein the second capacity is less than the first capacity;
determining that a condition of the second block falls below a second predetermined threshold;
formatting the second block to obtain a third block which has a third capacity, wherein the third capacity is less than the second capacity; and
responsive to determining that a condition of the third block falls below a third predetermined threshold, formatting the third block to obtain a fourth block which has the third capacity and comprises a non-volatile cache of the non-volatile memory.

2. The method of claim 1, further comprising:
determining that the condition of the second block falls below the third predetermined threshold; and
formatting the second block to obtain a fifth block which has a third capacity, wherein the third capacity is less than the second capacity.

3. The method of claim 2, further comprising:
determining that the condition of the first block falls below the third predetermined threshold; and
formatting the first block to obtain a sixth block which has the third capacity and comprises a non-volatile cache of the non-volatile memory.

4. The method of claim 3, further comprising:
flushing data stored in the non-volatile cache directly to an available block of the non-volatile memory without the controller decoding or encoding the data.

5. The method of claim 3, further comprising:
prior to formatting the first, second, or third block, reading out data stored in the first, second, or third block to be stored in a data buffer.

6. The method of claim 3, wherein the non-volatile memory comprises:
a first type of storage with blocks which have the first capacity and store a first number of bits per cell, wherein the first number is four;
a second type of storage with blocks which have the second capacity and store a second number of bits per cell, wherein the second number is two;
a third type of storage with blocks which have the third capacity and store a third number of bits per cell, wherein the third number is one; and
the non-volatile cache, which has the third capacity and further stores data of an inconsistent or irregular size.

7. The method of claim 6, further comprising:
managing, by a flash translation layer module, a mapping table of logical addresses to physical addresses across the first, second, and third types of storage of the non-volatile memory.

8. The method of claim 1, wherein monitoring the condition of the plurality of blocks of the non-volatile memory further comprises:
generating a score for each block by dynamically assessing the condition of each block.

9. A computer system for facilitating data placement, the system comprising:
a processor; and
a memory coupled to the processor and storing instructions, which when executed by the processor cause the processor to perform a method, wherein the computer system is a storage device, the method comprising:

monitoring a condition of a plurality of blocks of a non-volatile memory;

determining that a condition of a first block falls below a first predetermined threshold, wherein the first block has a first capacity;

formatting the first block to obtain a second block which has a second capacity, wherein the second capacity is less than the first capacity;

determining that a condition of the second block falls below a second predetermined threshold;

formatting the second block to obtain a third block which has a third capacity, wherein the third capacity is less than the second capacity; and responsive to determining that a condition of the third block falls below a third predetermined threshold, formatting the third block to obtain a fourth block which has the third capacity and comprises a non-volatile cache of the non-volatile memory.

10. The computer system of claim 9, wherein the method further comprises:

determining that the condition of the second block falls below the third predetermined threshold; and formatting the second block to obtain a fifth block which has a third capacity, wherein the third capacity is less than the second capacity.

11. The computer system of claim 10, wherein the method further comprises:

determining that the condition of the first block falls below the third predetermined threshold; and formatting the first block to obtain a sixth block which has the third capacity and comprises a non-volatile cache of the non-volatile memory.

12. The computer system of claim 11, wherein the method further comprises:

flushing data stored in the non-volatile cache directly to an available block of the non-volatile memory without the controller decoding or encoding the data.

13. The computer system of claim 11, wherein the method further comprises:

prior to formatting the first, second, or third block, reading out data stored in the first, second, or third block to be stored in a data buffer.

14. The computer system of claim 11, wherein the non-volatile memory comprises:

a first type of storage with blocks which have the first capacity and store a first number of bits per cell, wherein the first number is four;

a second type of storage with blocks which have the second capacity and store a second number of bits per cell, wherein the second number is two;

a third type of storage with blocks which have the third capacity and store a third number of bits per cell, wherein the third number is one; and the non-volatile cache, which has the third capacity and further stores data of an inconsistent or irregular size.

15. The computer system of claim 14, wherein the method further comprises:

managing, by a flash translation layer module, a mapping table of logical addresses to physical addresses across the first, second, and third types of storage of the non-volatile memory.

16. The computer system of claim 9, wherein monitoring the condition of the plurality of blocks of the non-volatile memory further comprises:

generating a score for each block by dynamically assessing the condition of each block.

17. A non-transitory computer-readable storage medium storing instructions that when executed by a computer cause the computer to perform a method, the method comprising:

monitoring a condition of a plurality of blocks of a non-volatile memory;

determining that a condition of a first block falls below a first predetermined threshold, wherein the first block has a first capacity;

formatting the first block to obtain a second block which has a second capacity, wherein the second capacity is less than the first capacity;

determining that a condition of the second block falls below a second predetermined threshold;

formatting the second block to obtain a third block which has a third capacity, wherein the third capacity is less than the second capacity; and responsive to determining that a condition of the third block falls below a third predetermined threshold, formatting the third block to obtain a fourth block which has the third capacity and comprises a non-volatile cache of the non-volatile memory.

18. The storage medium of claim 17, wherein the method further comprises:

determining that the condition of the second block falls below the third predetermined threshold;

formatting the second block to obtain a fifth block which has a third capacity, wherein the third capacity is less than the second capacity;

determining that the condition of the first block falls below the third predetermined threshold; and formatting the first block to obtain a sixth block which has the third capacity and comprises a non-volatile cache of the non-volatile memory.

19. The storage medium of claim 18, further comprising:

flushing data stored in the non-volatile cache directly to an available block of the non-volatile memory without the controller decoding or encoding the data; and prior to formatting the first, second, or third block, reading out data stored in the first, second, or third block to be stored in a data buffer.

20. The storage medium of claim 18, wherein the non-volatile memory comprises:

a first type of storage with blocks which have the first capacity and store a first number of bits per cell, wherein the first number is four;

a second type of storage with blocks have the second capacity and which store a second number of bits per cell, wherein the second number is two;

a third type of storage with blocks which have the third capacity and store a third number of bits per cell, wherein the third number is one; and the non-volatile cache, which has the third capacity and further stores data of an inconsistent or irregular size.

\* \* \* \* \*